(12) United States Patent
Huang

(10) Patent No.: US 8,292,460 B2
(45) Date of Patent: Oct. 23, 2012

(54) HYBRID LIGHT SOURCE SYSTEM

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 380 days.

(21) Appl. No.: 12/769,290

(22) Filed: Apr. 28, 2010

(65) Prior Publication Data

US 2010/0321951 A1 Dec. 23, 2010

(30) Foreign Application Priority Data

Jun. 22, 2009 (TW) .............................. 98120801 A

(51) Int. Cl.
*F21V 13/00* (2006.01)
(52) U.S. Cl. .................. 362/242; 362/553; 362/583
(58) Field of Classification Search .................. 362/553, 362/583, 551, 234–243; 359/618–640
See application file for complete search history.

(56) References Cited

U.S. PATENT DOCUMENTS

2009/0273760 A1* 11/2009 Itoh ................................ 353/38
* cited by examiner

*Primary Examiner* — Joseph L Williams
*Assistant Examiner* — Fatima Farokhrooz
(74) *Attorney, Agent, or Firm* — Muncy, Geissler, Olds & Lowe, PLLC

(57) ABSTRACT

A hybrid light source system is disclosed. The hybrid light source system adapted to be used in a projection apparatus comprises a dichroic component, a first light source, a second light source and a light processing component. The dichroic component defines a light path, with the first light source capable of generating a first light which is projected towards to the dichroic component along the light path and the second light source capable of generating a second light which is projected towards the dichroic component along the light path and opposite to the first light. The first light comprises a first sort of light beams and a second sort of light beams, in which the first sort of light beams and the second light are guided by the dichroic component to form a hybrid light and travel into the light processing component along the light path.

22 Claims, 5 Drawing Sheets

HYBRID LIGHT SOURCE SYSTEM

This application claims the benefits of the priority based on Taiwan Patent Application No. 098120801 filed on Jun. 22, 2009, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a light source system for a projection apparatus, and in particular, to a hybrid light source system for a projection apparatus.

2. Descriptions of the Related Art

With the widespread use of projection apparatuses, the competition in the projection apparatus market has also become increasingly intensified. Under such circumstances, manufacturers must make great efforts in improving the quality of existing projection apparatuses to satisfy the demands of users and attract more consumers. For example, projecting an image with a wide color gamut to make the image close to the true color is an important factor in attracting consumers.

As can be known from conventional technologies, among the primary colors of projection apparatuses, the color red has the most prominent effect on imaging quality. Therefore, in a conventional projection apparatus 1 as shown in FIG. 1, a red laser 11 is used as a light source in addition to an ultra high pressure (UHP) lamp 12. This is because the laser provides light that has relatively concentrated frequencies and pure colors, and after the laser light is mixed with the light from the UHP lamp 12, colors of a wide gamut can be provided. According to the basic principles of optics, to avoid increasing the etendue in the conventional projection apparatus 1, light emitted from the red laser 11 and the UHP lamp 12, after travelling through the lens modules 13, 14 respectively, must transmit through a dichroic filter 15 to form a hybrid light source before entering the imaging system 16 for imaging. In this way, the light can be utilized more effectively. It should be appreciated that the arrowed lines in this figure are only used to schematically illustrate the primary light path.

In this projection apparatus, the red laser 11 and the UHP 12 project light towards the dichroic filter 15 at an angle of 45° respectively. The dichroic filter 15, with a film (not shown) coated thereon, allows the red laser beams emitted from the red laser 11 to pass therethrough, but reflects a portion of the light beams emitted from the UHP 12. With this arrangement, a portion of the light emitted from the UHP 12 that is in the same range of spectrum as the red light emitted from the red laser 11 will also travel through the dichroic filter 15. As can be known by those of ordinary skill in the art, the dichroic filter 15 is adapted to allow light beams within a predetermined spectrum range to pass therethrough due to the coating film thereof; additionally, the dichroic filter 15 results in a dichroic shift characteristic depending on the different incident angles of the light beams. More specifically, with the larger incident angle of a light beam, the dichroic shift will shift towards a shorter spectrum; i.e., as the incident angle increases, the spectrum of the light beam that is allowed to pass through the dichroic filter 15 becomes shorter. For example, the light beams provided by the UHP 12 and the laser 11 in FIG. 1 are incident to the dichroic filter 15 substantially at an angle approximately ranging from 41° to 49°.

According to the aforesaid dichroic shift characteristic, as shown in FIG. 2 where the vertical axis represents the light transmittance and the horizontal axis represents the wavelength, light beams incident to the dichroic filter 15 at different incident angles (e.g., 41°, 45°, 49°) will produce a shifted dichroic curve respectively. The curve indicated by the triangular symbols represents a dichroic curve corresponding to the incident angle of 49°, the smooth curve represents a dichroic curve corresponding to the incident angle of 45°, and the curve indicated by the circular symbols represents a dichroic curve corresponding to the incident angle of 41°. For the light beams emitted from the red laser 11 to completely transmit through the dichroic filter 15 in response to the light beams emitted from the UHP 12 that are incident on the dichroic filter 15 at different incident angles, the dichroic filter 15 must be designed to allow a larger range of light spectrum to pass therethrough. Thus, the light beams emitted from the red laser, of which the spectrum is as shown by the rectangle in FIG. 2 (near the wavelength of 640 nm), can still be included in the transmittable range of spectrum (as encircled by the dashed line) with the dichroic shift. However, a larger transmittable range of spectrum also means that the light beams emitted from the UHP lamp 12 will be transmitted through the dichroic filter 15 accordingly and will lead to a significantly degradation of light intensity intended for imaging, which is very unfavorable for the imaging quality.

In view of this, it is highly desirable in the art to mitigate the dichroic shift effect so that the brightness as well as the color gamut of images can be enhanced by the efficient use of the light.

SUMMARY OF THE INVENTION

One objective of this invention is to provide a hybrid light source system for a projection apparatus in which, through the arrangement of a dichroic component, light beams emitted from a UHP lamp and a laser are projected towards the dichroic component at small incident angles along a main light path respectively to mitigate the dichroic shift effect of the dichroic component so that image colors are presented in a wide gamut without decreasing the imaging luminance.

The hybrid light source system comprises a dichroic component, a first light source, a second light source and a light processing component. The dichroic component defines a light path. The first light source and the second light source are an UHP lamp and a laser that are adapted to generate a first light and a second light respectively, wherein the first light is guided by a light guide component to project towards the dichroic component along the light path, and the second light is projected towards the dichroic component along the light path and opposite to the first light. Additionally, the light processing component is disposed in the light path. The first light comprises a first sort of light beams and a second sort of light beams. According to the arrangement of the dichroic component, the first sort of light beam of the first light and the second light are combined to form a hybrid light beam and travel into the light processing component along the light path.

As the incident angle at which the first light is incident on the dichroic component decreases, the dichroic shift effect is mitigated so that the first light can effectively be provided to the light intended for imaging to prevent degradation of the imaging luminance.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 3:
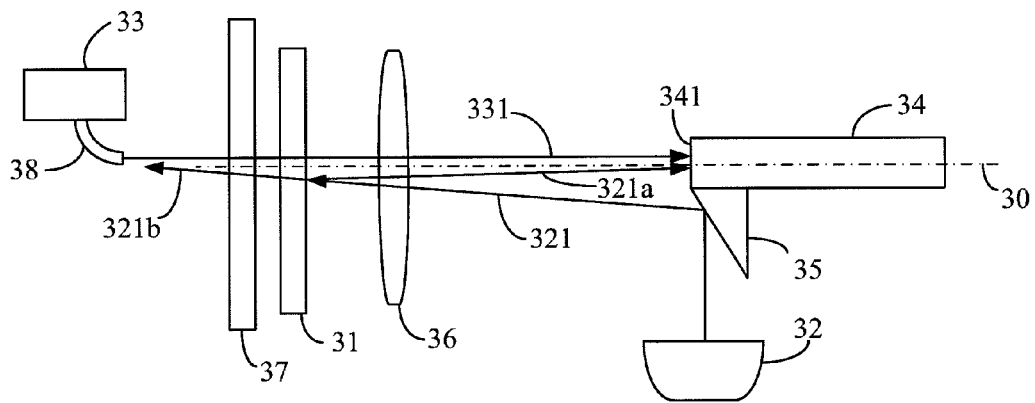
FIG. 3 is a schematic view of a hybrid light source system according to the first embodiment of the present invention.

As shown in FIG. 3, the first embodiment of the present invention is a hybrid light source system 3 adapted for use in a projection apparatus (not shown). The hybrid light source system 3 comprises a dichroic component 31, a first light source 32, a second light source 33 and a light processing component 34. The dichroic component 31 defines a light path 30. The first light source 32 and the second light source 33 are adapted to generate a first light 321 and a second light 331 respectively. The first light 321 is projected towards the dichroic component 31 along the light path 30, in which the first light 321 comprises a first sort of light beams 321a and a second sort of light beams 321b. The second light 331 is projected towards the dichroic component 31 along the light path 30 and opposite to the first light 321. Additionally, the light processing component 34 is disposed along the light path 30. With this arrangement, after the first light 321 and the second light 331 are projected to the dichroic component 31 respectively, the first sort of light beams 321a of the first light 321 and the second light 331 will travel into the light processing component 34 along the light path 30.

More specifically, in this embodiment, the first light source 32 is an UHP lamp, and the first light 321 emitted therefrom is a white light; the second light source 33 is a laser source, and the second light 331 emitted therefrom is a red laser. The laser source may further be connected to an optical fiber 38 so that the second light 331 (i.e., the red laser) is guided by the optical fiber 38 towards the dichroic component 31 along the light path 30. Preferably, the laser source is a laser array (i.e., the second light source 33 consists of a plurality of laser sources) adapted to provide a plurality of second light 331 to enhance the intensity of the second light 331.

Furthermore, the hybrid light source system 3 of the present invention further comprises a light guiding component 35 disposed adjacent to the light processing component 34. The light guiding component 35 is a reflector or a prism adapted to reflect the first light 321 projected by the first light source 32 towards the dichroic component 31. If the light guiding component 35 is a prism, the surface of the prism is coated with a reflective film. In addition, as shown in FIG. 3, the light processing component 34 of this embodiment is an integration rod that has an incident surface 341. The light guiding component 35 is substantially disposed adjacent to the light incident surface 341. Due to the locations of the light guiding component 35 and the integration rod relative to each other, the first light 321 reflected from the light guiding component 35 is adapted to be projected towards the dichroic component 31 along the light path 30 at a small incident angle, which helps to mitigate the dichroic shift effect caused by the dichroic component 31. It should be appreciated that although the light processing component 34 is an integration rod in this embodiment, it may also be made of other components in other embodiments depending on the different system requirements, for example, a color wheel.

In this embodiment, the dichroic component 31 is a narrow band pass filter adapted to allow red light within a predetermined range of spectrum to pass therethrough. The second sort of light beams 321b of the first light 321 and the second light 331 (i.e., the red laser) fall within this range of spectrum, while the first sort of light beams 321a falls beyond the range of the spectrum. Thus, the dichroic component 31 allows the second sort of light beams 321b and the second light 331 to pass therethrough, but reflects the first sort of light beams 321a, thereby mixing the first sort of light beams 321a and the second light 331 into a hybrid light, which then travels via the incident surface 341 into the integration rod for imaging in the projection apparatus.

In this embodiment, the hybrid light source system 3 further comprises a condenser lens 36. The condenser lens 36 is disposed between the dichroic component 31 and the light processing component 34, and preferably adjacent to the dichroic component 31, so that the first light 321 is focused at and reflected by the light guiding component 35 and then transformed into parallel light via the condenser lens 36. Thus, the first light 321 is incident onto the dichroic component 31 at an identical incident angle, which allows the dichroic component 31 to transmit/reflect light within the predetermined spectrum. Afterwards, the second light 331 transmitted through the dichroic component 31 and the first sort of light beams 321a reflected from the dichoric component 31 are condensed through the condenser lens 36 and directed into the light processing component 34 (i.e., the integration rod) via the incident surface 341.

In this embodiment, the second light source 33 is substantially a laser light source. To reduce the coherence that exists in the laser light, the hybrid light source system 3 further comprises a scattering plate 37 to scatter the second light 331.

Figure 1:
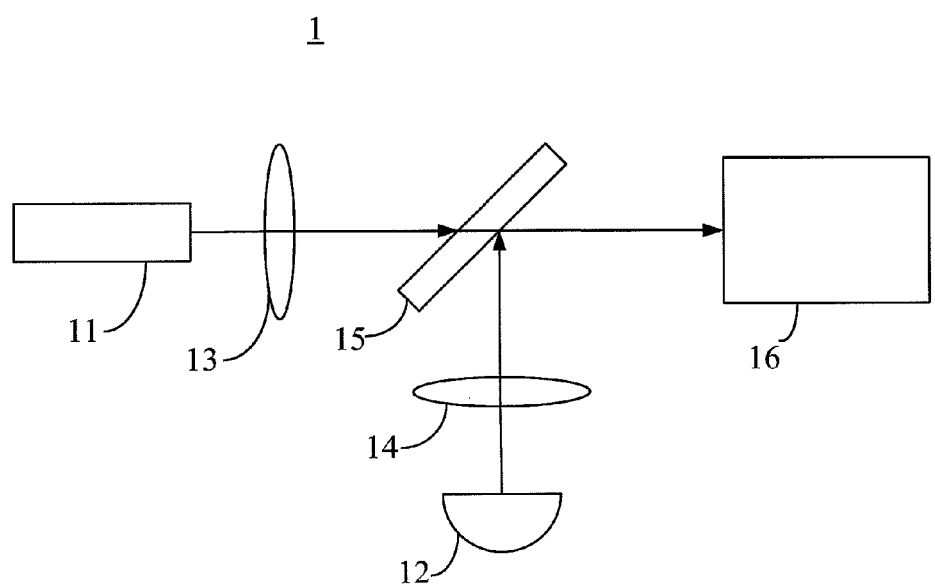
FIG. 1 is a schematic view of a conventional projection apparatus comprising a hybrid light source.
Figure 2:
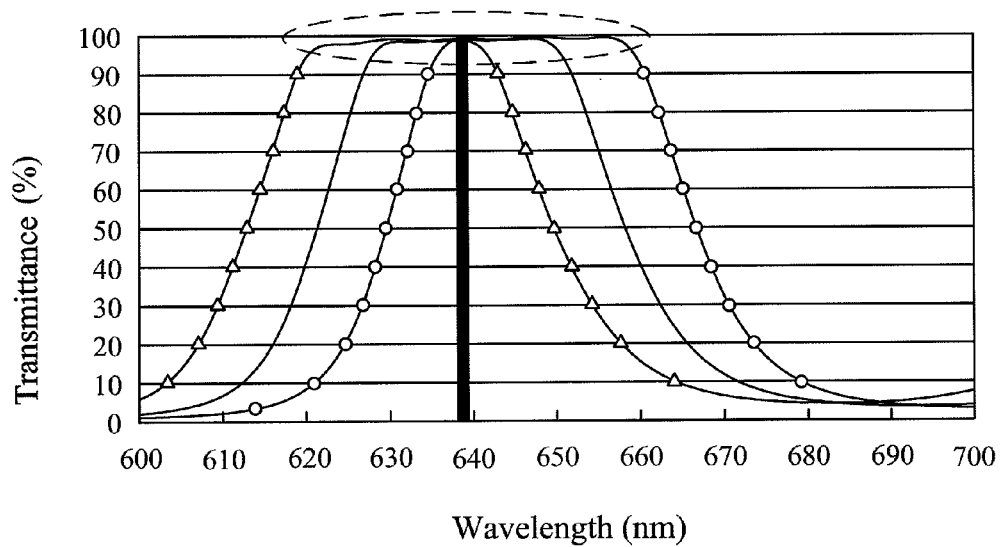
FIG. 2 is a graph illustrating dichroic shifts produced by the hybrid light source of FIG. 1.
Figure 4:
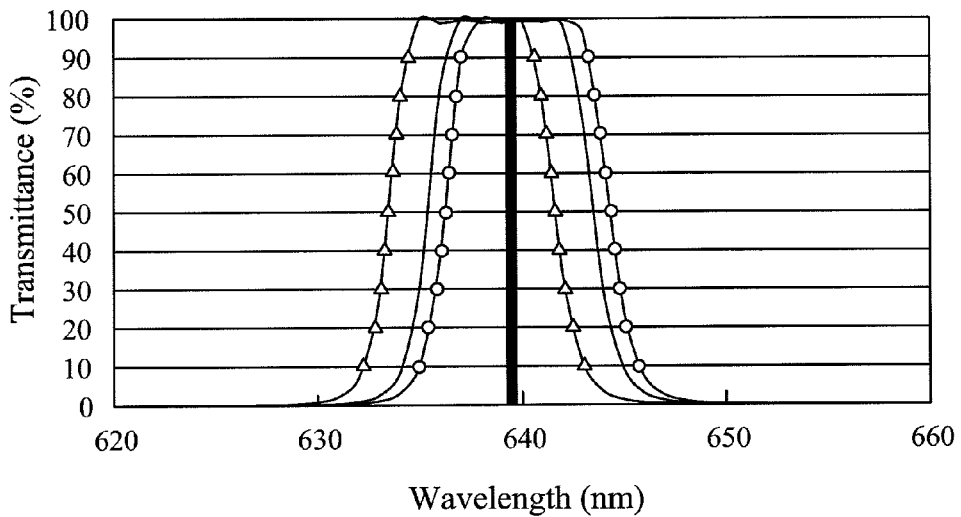
FIG. 4 is a graph illustrating dichroic shifts produced by the hybrid light source system of FIG. 3.

With the aforesaid arrangement, in the hybrid light source system 3 of this embodiment, the white light (i.e., the first light 321) provided by the UHP lamp (i.e., the first light source 32) is incident onto the dichroic component 31 at a small incident angle. Therefore, as shown in FIG. 4, the small incident angle leads to a slight dichroic shift effect, which renders the designed range of spectrum of light transmitted through the dichroic component 31 much narrower as compared to the conventional technology shown in FIG. 2. Accordingly, the range of spectrum of the first sort of light beams 321a reflected from the dichroic component 31 is increased while the red laser (i.e., the second light 331) emitted from the second light source 33 can still transmit through the dichroic component 31. In addition to increase the color gamut for the projected images, the hybrid light beams thus formed may also give contribution to the brightness of the total system. It should be appreciated that in FIG. 4, the light projected by the UHP lamp (i.e., the first light source 32) and the laser source (i.e., the second light source 33) of this embodiment is incident onto the dichroic component 31 at an incident angle ranging substantially from about 1° to 9°. As shown, the curve indicated by the triangular symbols represents a dichroic curve corresponding to the incident angle of 9°, the smooth curve represents a dichroic curve corresponding to the incident angle of 5° (i.e., primary light), the curve indicated by the round symbols represents a dichroic curve corresponding to the incident angle of 1°, and the rectangular blocks represent the spectrum of the second light 331.

Figure 5A:
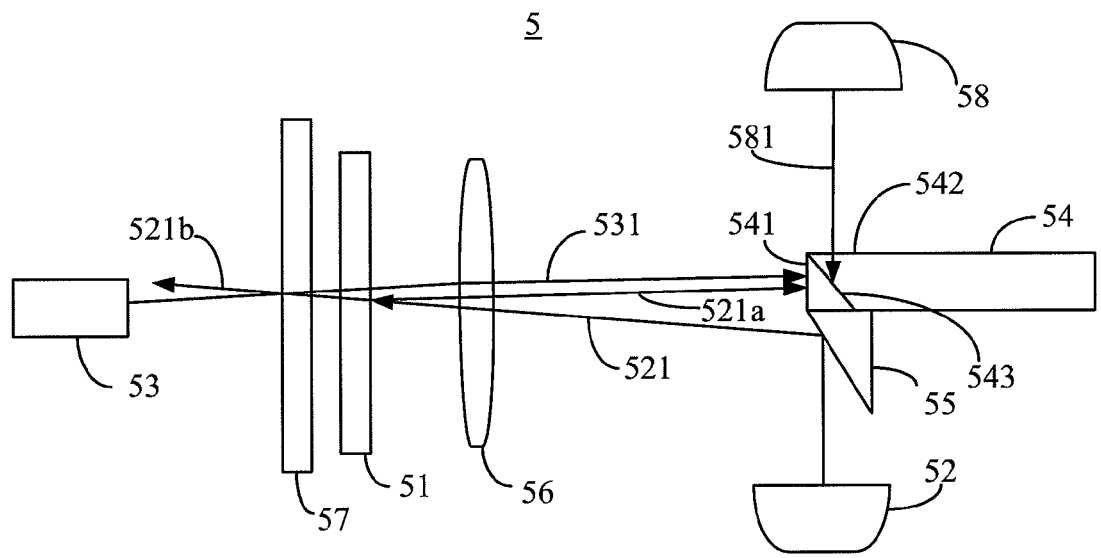
FIG. 5A is a schematic top view of a hybrid light source system according to the second embodiment of the present invention.

A hybrid light source system 5 according to the second embodiment of the present invention is shown in FIG. 5A. Similar to the first embodiment, the hybrid light source system 5 comprises a dichroic component 51, a first light source 52, a second light source 53, a light processing component 54, a light guiding component 55, a condenser lens 56 and a scattering plate 57. The first light source 52 is adapted to generate a first light 521 comprising a first sort of light beams 521a and a second sort of light beams 521b. The second light source 53 is adapted to generate a second light 531. In this embodiment, the way in which the first light 521 and the second light 531 are transferred and the relative positions of the individual components are similar to those of the first embodiment, and thus will not be described again herein.

Figure 5B:
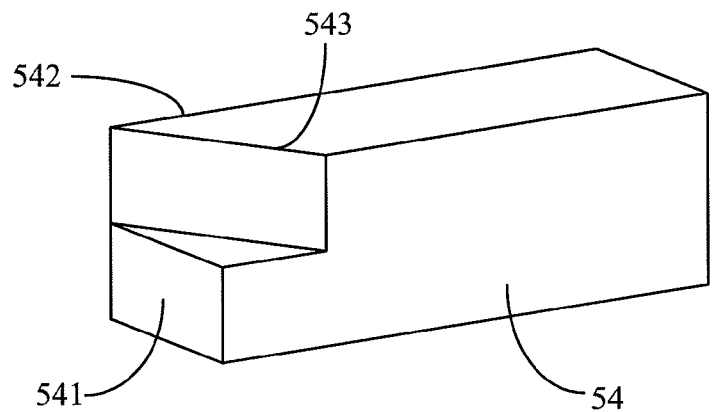
FIG. 5B is a schematic perspective view of a light processing component shown in FIG. 5A.

With reference to FIG. 5B as well, unlike the first embodiment, the light processing component 54 of this embodiment is a first integration rod which, in addition to the first incident surface 541, further comprises a first reflective surface 543 and a second incident surface 542 adjacent to the first incident surface 541 and the first reflective surface 543. Additionally, the hybrid light source system 5 further comprises a third light source 58 disposed opposite to the first light source 52 and adapted to generate a third light 581. It should be appreciated that, similar to the first embodiment, the hybrid light formed by the first sort of light beams 521a and the second light 531 travels into the first integration rod via the first incident surface 541, while the third light 581 transmits through the second incident surface 542 and is reflected from the first reflective surface 543 into the first integration rod. Wherein, the third light source 58 may be a UHP lamp, and the third light 581 is a white light. With the aforesaid arrangement, the third light 581 is mixed into the hybrid light without being affected by the dichroic component 51, thereby further enhancing the intensity of the hybrid light.

Figure 6A:
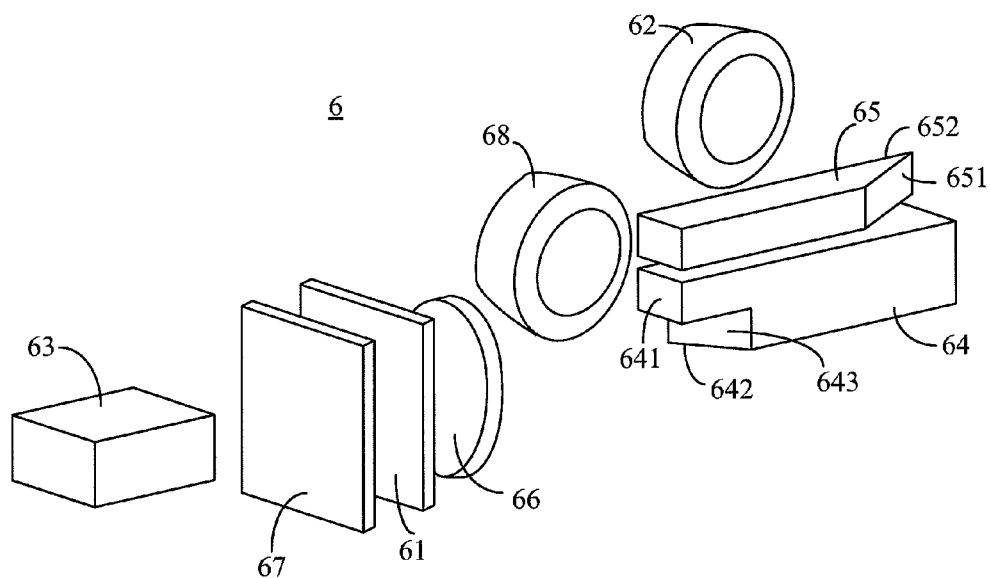
FIG. 6A is a schematic perspective view of a hybrid light source system according to the third embodiment of the present invention.
Figure 6B:
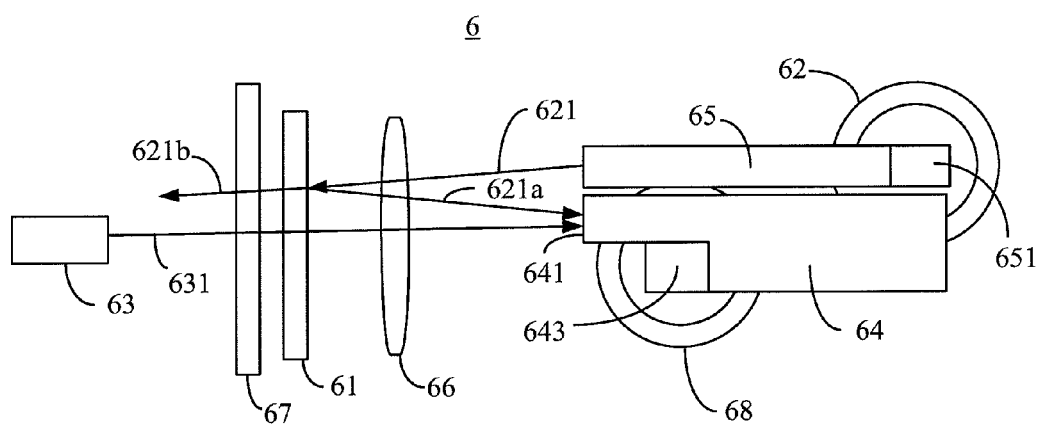
FIG. 6B is a schematic side view of the hybrid light source system shown in FIG. 6A.
Figure 6C:
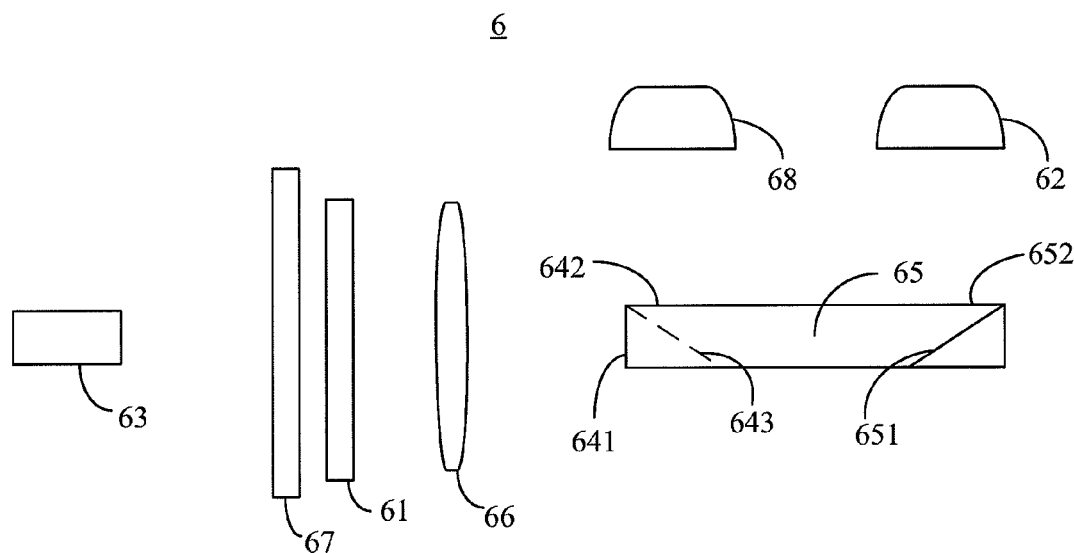
FIG. 6C is a schematic top view of the hybrid light source system shown in FIG. 6A.

A hybrid light source system 6 according to the third embodiment of the present invention is shown in FIGS. 6A through 6C. Similar to the second embodiment, the hybrid light source system 6 comprises a dichroic component 61, a first light source 62, a second light source 63, a light processing component 64, a light guiding component 65, a condenser lens 66 and a scattering plate 67. Hereinafter, only differences from the second embodiment will be further described. In this embodiment, the hybrid light source system 6 further comprises a third light source 68. To prevent the mutual influence of first light source 62 and the third light source 68 due to the heat they generate, the third light source 68 is disposed on the same side as the first light source 62. In this embodiment, the light processing component 64 is a first integration rod, while the light guiding component 65 is a second integration rod stacked with the first integration rod. The first integration rod has a first incident surface 641, a second incident surface 642 and a first reflective surface 643. The second integration rod has a second reflective surface 651 and a third incident surface 652. In this embodiment, the first light 621 emitted from the first light source 62 is transmitted through the third incident surface 652, reflected from the second reflective surface 651 into the second integration rod and then projected towards the dichroic component 61. It should be appreciated that, because the second integration rod is disposed adjacent and stacked to the first integration rod, the first light 621 emitted from the second integration rod is incident to the dichroic component 61 at a small incident angle to prevent an excessive dichroic shift effect. Subsequently, the first sort of light beams 621a of the first light 621 and the second light 631 emitted from the second light source 63 are combined into a hybrid light that travels from the first incident surface 641 into the first integration rod (i.e., the light processing component 64), while the second sort of light beams 621b of the first light 621 is transmitted through the dichroic component 61. Simultaneously, the third light (not shown) emitted from the third light source 68 is transmitted through the second incident surface 642 and reflected from the first reflective surface 643 into the first integration rod. Thereby, the purpose of enhancing the intensity of the hybrid light can also be accomplished.

According to the above descriptions, the present invention provides a hybrid light source system that mitigates the dichroic shift effect by reducing the incident angles of the light incident on the dichroic component, thereby increasing the color gamut of images projected and overcoming the shortcoming of brightness loss of conventional technologies. Furthermore, the hybrid light source system of the present invention may further enhance the intensity of the hybrid light by increasing the number of light sources. Additionally, the hybrid light source system of the present invention may further form an independent light source system adapted for use in various other apparatuses.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A hybrid light source system, comprising:
a dichroic component defining a light path;
a first light source being capable of generating a first light which is projected towards the dichroic component along the light path;
a second light source being capable of generating a second light which is projected towards the dichroic component along the light path and opposite to the first light; and
a light processing component disposed on the light path;
wherein the first light comprises a first sort of light beams and a second sort of light beams, in which the first sort of light beams and the second light are guided by the dichroic component and travel into the light processing component along the light path.

2. The hybrid light source system as claimed in claim 1, further comprising a light guiding component disposed adjacent to the light processing component to guide the first light traveling along the light path towards the dichroic component.

3. The hybrid light source system as claimed in claim 2, wherein the dichroic component allows the second sort of light beams and the second light passing therethrough and reflects the first sort of light beams to form a hybrid light by combining the first sort of light beams and the second light.

4. The hybrid light source system as claimed in claim 3, further comprising a condenser lens disposed adjacent to the dichroic component for condensing the first sort of light beams and the second light towards the light processing component.

5. The hybrid light source system as claimed in claim 3, further comprising a scattering plate to scatter the second light.

6. The hybrid light source system as claimed in claim 3, wherein the light guiding component is a reflector or a prism.

7. The hybrid light source system as claimed in claim 3, wherein the light processing component comprises a color wheel.

8. The hybrid light source system as claimed in claim 3, wherein the light processing component comprises an integration rod.

9. The hybrid light source system as claimed in claim 3, wherein the light processing component comprises a first integration rod and the hybrid light source system further comprises a third light source generating a third light projected towards the first integration rod.

10. The hybrid light source system as claimed in claim 4, wherein the first light source is an ultra high pressure (UHP) lamp and the first light is white light.

11. The hybrid light source system as claimed in claim 10, wherein both the second sort of light beams and the second light are red light being within a range of spectrum and the first sort of light beams being out of the range of spectrum.

12. The hybrid light source system as claimed in claim 11, wherein the dichroic component is a narrow band pass filter for the red light passing therethrough.

13. The hybrid light source system as claimed in claim 12, wherein the second light source is a laser source.

14. The hybrid light source system as claimed in claim 13, wherein the laser source is a laser array.

15. The hybrid light source system as claimed in claim 13, further comprising an optical fiber connected to the laser source, the second light being guided by the optical fiber and projected towards the dichroic component along the light path.

16. The hybrid light source system as claimed in claim 6, wherein the prism having a surface coated with a reflective film.

17. The hybrid light source system as claimed in claim 8, wherein the integration rod comprises an incident surface for the hybrid light passing therethrough to travel into the integration rod.

18. The hybrid light source system as claimed in claim 17, wherein the light guiding component disposed adjacent to the incident surface.

19. The hybrid light source system as claimed in claim 9, wherein the third light source is disposed opposite to the first light source.

20. The hybrid light source system as claimed in claim 9, wherein the light guiding component is a second integration rod, the first integration rod having a first incident surface, a second incident surface and a first reflecting surface, and the second integration rod having a second reflecting surface and a third incident surface.

21. The hybrid light source system as claimed in claim 19, wherein the first integration rod has a first incident surface, a second incident surface and a first reflecting surface, the hybrid light traveling into the first integration rod through the first incident surface and the third light traveling into the first integration rod through the second incident surface and the first reflecting surface.

22. The hybrid light source system as claimed in claim 20, wherein the first integration rod and the second integration rod are stacked, the first light traveling into the second integration rod through the third incident surface and the second reflecting surface to be projected towards the dichroic component, the hybrid light traveling into the first integration rod through the first incident surface, and the third light traveling into the first integration rod through the second incident surface and the first reflecting surface.

* * * * *